United States Patent
Kim et al.

(10) Patent No.: US 9,413,909 B2
(45) Date of Patent: Aug. 9, 2016

(54) IMAGE READING APPARATUS

(71) Applicant: FUJI XEROX CO., LTD., Tokyo (JP)

(72) Inventors: Dalyong Kim, Kanagawa (JP);
Sangchun Park, Kanagawa (JP);
Nobuyuki Maruno, Kanagawa (JP);
Yuichi Mikuni, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/723,743

(22) Filed: May 28, 2015

(65) Prior Publication Data

US 2016/0127587 A1 May 5, 2016

(30) Foreign Application Priority Data

Oct. 29, 2014 (JP) .................. 2014-220097

(51) Int. Cl.
*H04N 1/04* (2006.01)
*H04N 1/00* (2006.01)

(52) U.S. Cl.
CPC ....... *H04N 1/00559* (2013.01); *H04N 1/00557* (2013.01)

(58) Field of Classification Search
CPC .......... H04N 2201/0081; H04N 1/121; H04N 1/1245; H04N 2201/045; H04N 1/00559; H04N 2201/02402; H04N 2201/0242; H04N 2201/044; H04N 1/00588
USPC ......... 358/474, 498, 461, 406, 482, 483, 484, 358/505, 497, 1.13, 1.15, 296, 1.1, 401, 358/449, 502, 509, 528; 399/111, 120, 257, 399/301, 44, 55, 13, 24, 3; 271/267, 272, 271/162, 171, 109, 126, 145, 147, 3.14, 271/8.1; 355/22; 382/124, 127, 315, 317, 382/323

See application file for complete search history.

(56) References Cited

U.S. PATENT DOCUMENTS

| | | | | |
|---|---|---|---|---|
| 6,594,037 | B1 * | 7/2003 | Takahashi | H04N 1/1017 358/473 |
| 6,999,212 | B2 * | 2/2006 | Mai | H04N 1/401 358/504 |
| 7,202,980 | B2 * | 4/2007 | Hayashi | H04N 1/02815 250/216 |
| 9,036,226 | B2 * | 5/2015 | Fuke | H04N 1/123 358/474 |
| 2006/0092481 | A1 * | 5/2006 | Nakano | H04N 1/1017 358/474 |
| 2006/0146375 | A1 * | 7/2006 | Baek | H04N 1/1017 358/474 |
| 2007/0030534 | A1 * | 2/2007 | Ikeno | H04N 1/1017 358/498 |

(Continued)

FOREIGN PATENT DOCUMENTS

JP 2013-225758 A 10/2013

*Primary Examiner* — Negussie Worku
(74) *Attorney, Agent, or Firm* — Sughrue Mion, PLLC

(57) ABSTRACT

An image reading apparatus includes a reading unit that is arranged so as to extend in one direction and that moves in a crossing direction, which crosses the one direction, to read an image of a document; a unit support that is arranged so as to extend in the crossing direction and that supports the reading unit that moves; and an end support that supports an end portion of the reading unit in a longitudinal direction, the reading unit trying to rotate around the unit support such that the end portion moves downward.

16 Claims, 5 Drawing Sheets

(56) References Cited

U.S. PATENT DOCUMENTS

| | | | |
|---|---|---|---|
| 2007/0195381 A1* | 8/2007 | Yamazaki | H04N 1/00559 358/502 |
| 2008/0198426 A1* | 8/2008 | Yokochi | H04N 1/00013 358/486 |
| 2009/0244652 A1* | 10/2009 | Osakabe | H04N 1/1017 358/474 |
| 2010/0245950 A1* | 9/2010 | Osakabe | H04N 1/0464 358/498 |
| 2011/0075213 A1* | 3/2011 | Murayama | G03G 21/1882 358/1.15 |
| 2011/0141192 A1* | 6/2011 | Komuro | B41J 23/025 347/37 |
| 2011/0241278 A1* | 10/2011 | Cheng | B65H 3/0684 271/109 |
| 2012/0082483 A1* | 4/2012 | Nakatsu | G03G 21/1666 399/177 |
| 2013/0057929 A1* | 3/2013 | Niimura | H04N 1/1017 358/474 |
| 2013/0194370 A1* | 8/2013 | Sakaue | G02B 26/123 347/118 |
| 2015/0077484 A1* | 3/2015 | Nagashima | B41J 2/17553 347/86 |

* cited by examiner

IMAGE READING APPARATUS

CROSS-REFERENCE TO RELATED APPLICATIONS

This application is based on and claims priority under 35 USC 119 from Japanese Patent Application No. 2014-220097 filed Oct. 29, 2014.

BACKGROUND

The present invention relates to an image reading apparatus.

SUMMARY

According to an aspect of the invention, there is provided an image reading apparatus including a reading unit that is arranged so as to extend in one direction and that moves in a crossing direction, which crosses the one direction, to read an image of a document; a unit support that is arranged so as to extend in the crossing direction and that supports the reading unit that moves; and an end support that supports an end portion of the reading unit in a longitudinal direction, the reading unit trying to rotate around the unit support such that the end portion moves downward.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described with reference to the accompanying drawings.

Figure 1:
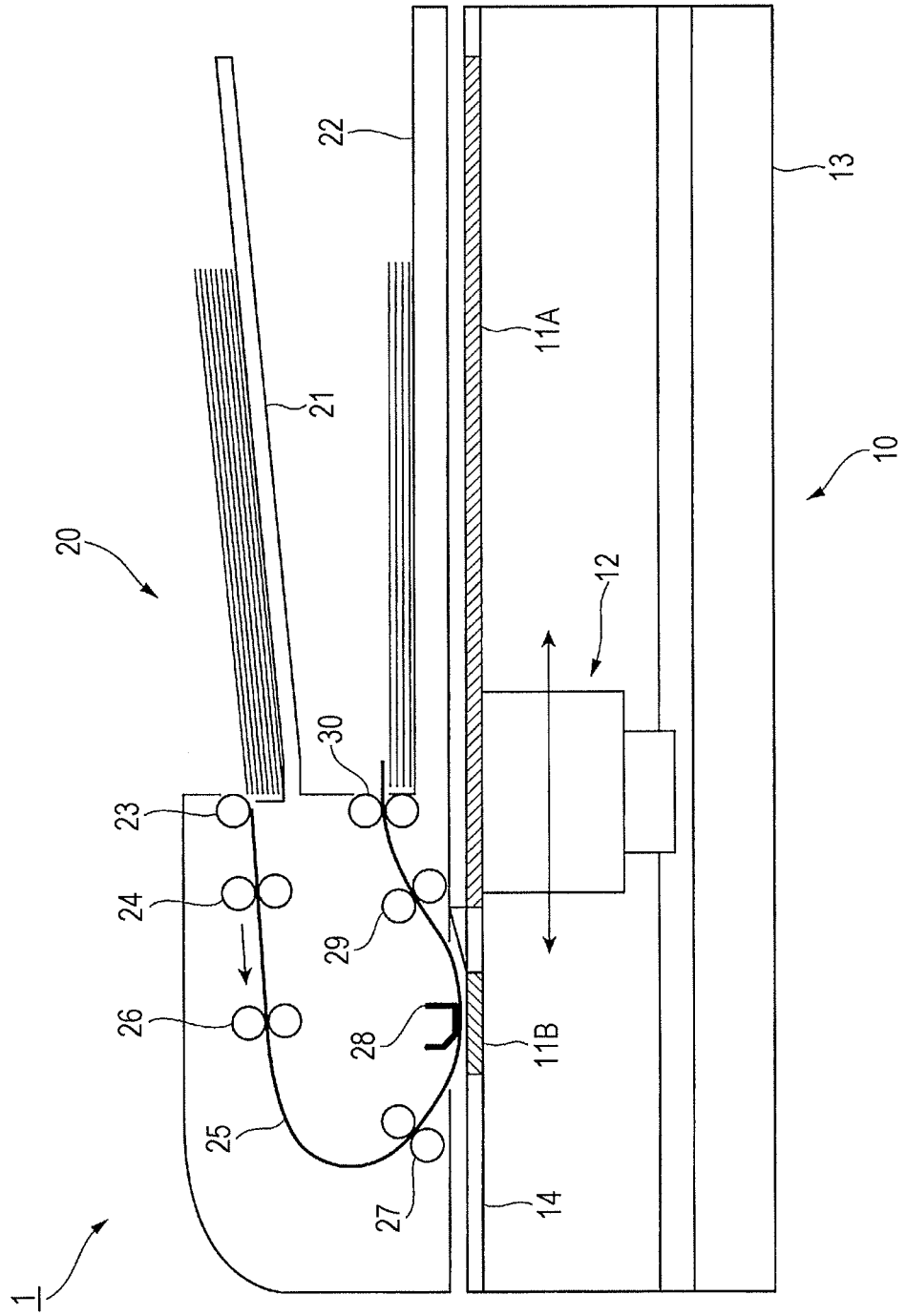
FIG. 1 illustrates the overall structure of an image reading apparatus.

FIG. 1 illustrates the overall structure of an image reading apparatus 1.

The image reading apparatus 1 illustrated in FIG. 1 includes a scanner device 10 that reads an image of a document by scanning the document and a document feeder 20 that successively feeds document sheets that are stacked.

The document feeder 20 includes a document receiver 21 that receives a stack of document sheets and an output sheet receiver 22 that is disposed below the document receiver 21 and that receives the document sheets that have been scanned. The document feeder 20 also includes a feed roller 23 that feeds the document sheets stacked on the document receiver 21 and a separating mechanism 24 that separates the sheets from each other.

The document sheets are transported along a transport path 25. Transport rollers 26 and registration rollers 27 are arranged along the transport path 25. The transport rollers 26 transport the document sheets that have been separated from each other toward rollers located downstream of the transport rollers 26. The registration rollers 27 feed the document sheets while performing a registration adjustment.

A chute 28 is located so as to oppose a back side of a document sheet that is being read by the scanner device 10. After the document sheet is read, the document sheet is transported further downstream by output rollers 29. Then, the document sheet is ejected to the output sheet receiver 22 by ejection rollers 30.

The scanner device 10 includes a housing 13 and an upper cover 14.

A first platen glass 11A and a second platen glass 11B are attached to the upper cover 14. The first platen glass 11A receives a document sheet in a stationary state. The second platen glass 11B transmits light used to read the document sheet while the document sheet is being transported by the document feeder 20.

A reading unit 12 and a moving mechanism that moves the reading unit 12 in the left-right direction in FIG. 1 are disposed in the housing 13. The reading unit 12 reads the document sheet while the document sheet is placed on the first platen glass 11A or being transported by the document feeder 20.

The reading unit 12 includes a light source formed of a light emitting diode (LED) or the like, a rod lens array that focuses light reflected by the document sheet, and an image sensor that receives the light focused by the rod lens array and generates image data.

Figure 2:
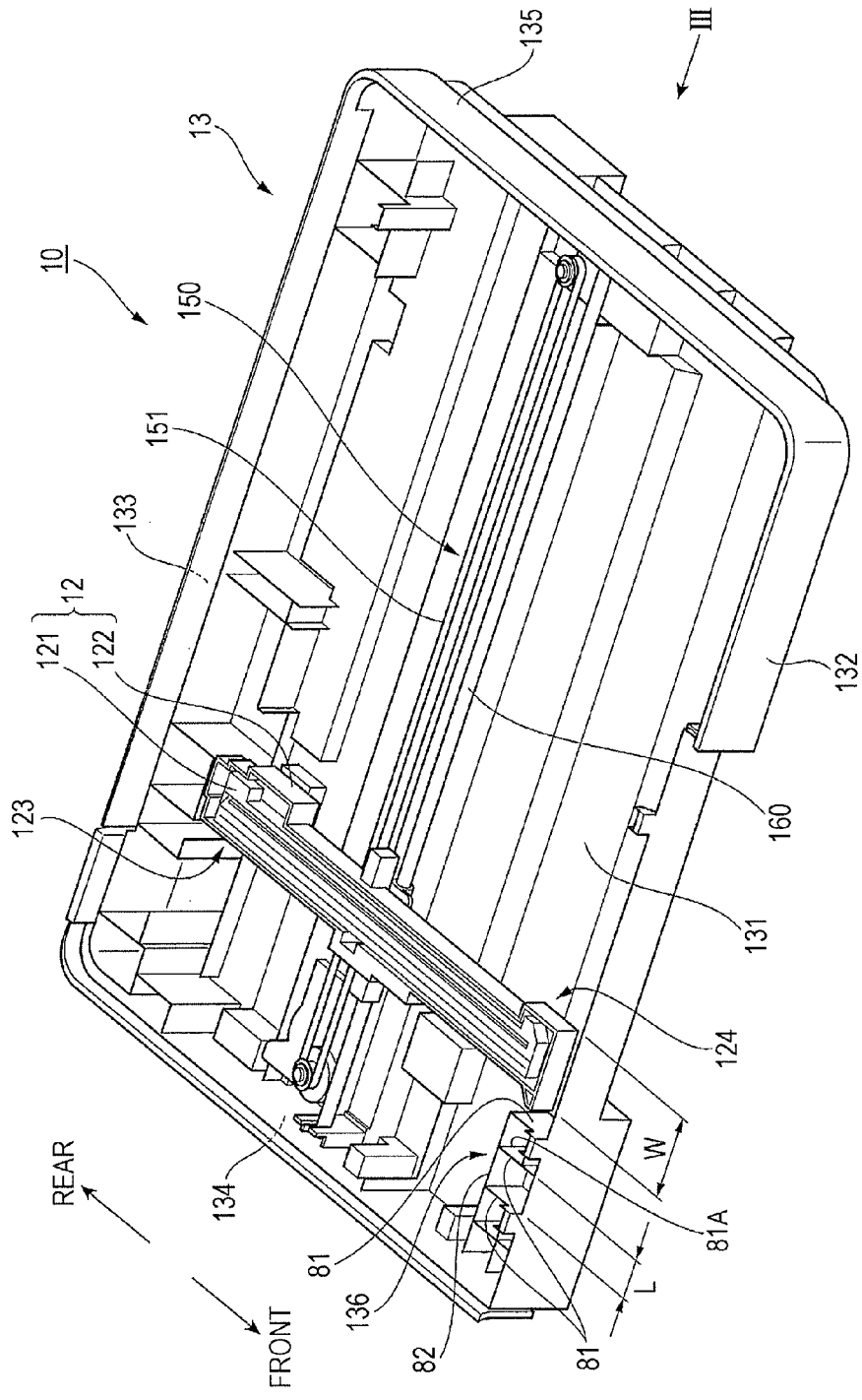
FIG. 2 illustrates a housing in the state in which an upper cover is not attached.

FIG. 2 illustrates the housing 13 in the state in which the upper cover 14 is not attached.

The housing 13 is box-shaped and includes a bottom portion 131. The housing 13 also includes a front surface 132, a rear surface 133 that opposes the front surface 132 and serves as an example of an opposite-side surface, and first and second side surfaces 134 and 135 that connect the front surface 132 and the rear surface 133.

A hinge (not shown) for enabling the document feeder 20 (see FIG. 1) to be opened and closed is provided in a rear section of the scanner device 10. In the present exemplary embodiment, the document feeder 20 is capable of being pivoted toward the rear of the scanner device 10. Therefore, a document sheet cannot be easily placed on the first platen glass 11A (see FIG. 1) from the rear, and an operator that operates the image reading apparatus 1 normally operates the image reading apparatus 1 from the front.

In the present exemplary embodiment, the front surface 132 is located near the operator (opposes the operator) when the operator operates the image reading apparatus 1. Thus, the front surface 132 according to the present exemplary embodiment may be regarded as an operator-side surface that is located near the operator.

As illustrated in FIG. 2, the housing 13 contains the reading unit 12. The reading unit 12 includes a unit body 121 and a unit container 122 that contains the unit body 121. The light source, the rod lens array, and the image sensor are contained in the unit body 121.

Urging members (not shown), which urge the unit body 121 upward, are disposed between a bottom portion of the unit body 121 and a bottom portion of the unit container 122.

In the present exemplary embodiment, the urging members urge the unit body 121 against the first platen glass 11A (see FIG. 1) or the second platen glass 11B. Accordingly, the distance between the image sensor included in the unit body 121 and the document sheet placed on the first or second platen glass 11A or 11B does not easily vary.

The reading unit 12 is arranged so as to extend in a transverse direction of the housing 13 (one direction). When the reading unit 12 reads a document sheet placed on the first platen glass 11A, the reading unit 12 moves in a longitudinal direction of the housing 13 (direction that crosses the one direction) while reading the document sheet.

The reading unit 12 includes one end portion at the far side in FIG. 2 (hereinafter referred to as a "far-side end portion 123"), and the other end portion at the near side in FIG. 2 (hereinafter referred to as a "near-side end portion 124").

In this specification, the one direction in which the reading unit 12 extends may be referred to as a first scanning direction, and the direction that crosses the one direction may be referred to as a second scanning direction.

A moving mechanism 150, which moves the reading unit 12 in the second scanning direction, is disposed in the housing 13. The moving mechanism 150 includes a belt 151 that is capable of circulating and attached to the reading unit 12, and a motor (not shown) that drives the belt 151.

A support shaft 160, which is an example of a unit support that supports the reading unit 12 from below, is also disposed in the housing 13. The support shaft 160 is arranged so as to extend in the second scanning direction.

An end rib unit 136, which supports the near-side end portion 124 of the reading unit 12 from below, is disposed behind (on the back side of) the front surface 132 in the housing 13.

The end rib unit 136, which is an example of an end support, is formed so as to extend upward in FIG. 2 from the bottom portion 131 of the housing 13, and supports the near-side end portion 124 at the top end thereof.

The end rib unit 136 includes plural transverse ribs 81 that are formed so as to extend in the transverse direction of the housing 13 and that are parallel to each other. The end rib unit 136 also includes a longitudinal rib 82 that is connected to the transverse ribs 81 and extends in a longitudinal direction of the housing 13.

The longitudinal rib 82 is closer to the rear surface 133 than the transverse ribs 81 are, and is connected to rear ends 81A of the transverse ribs 81.

Figure 3:
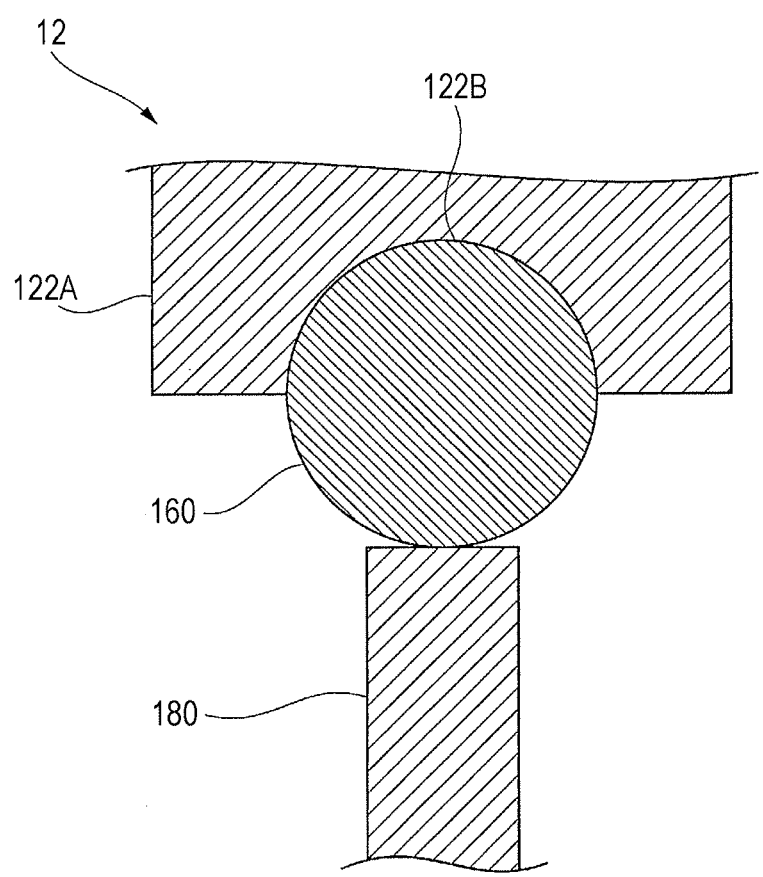
FIG. 3 illustrates a reading unit and a support shaft viewed in the direction shown by arrow III in FIG. 2.

FIG. 3 illustrates the reading unit 12 and the support shaft 160 viewed in the direction of arrow III in FIG. 2.

As illustrated in FIG. 3, the unit container 122 (see FIG. 2) of the reading unit 12 includes a projecting portion 122A that projects downward at the bottom thereof. A semicircular recess 122B is formed in the bottom surface of the projecting portion 122A.

In the present exemplary embodiment, the reading unit 12 is placed on the support shaft 160 such that the recess 122B receives the support shaft 160. Referring to FIG. 3, shaft ribs 180, which will be described below, are disposed below the support shaft 160.

The structure in which the reading unit 12 is placed on the support shaft 160 and supported from below is merely an example, and the reading unit 12 may instead be supported by a support shaft 160 that extends through the reading unit 12.

Figure 4:
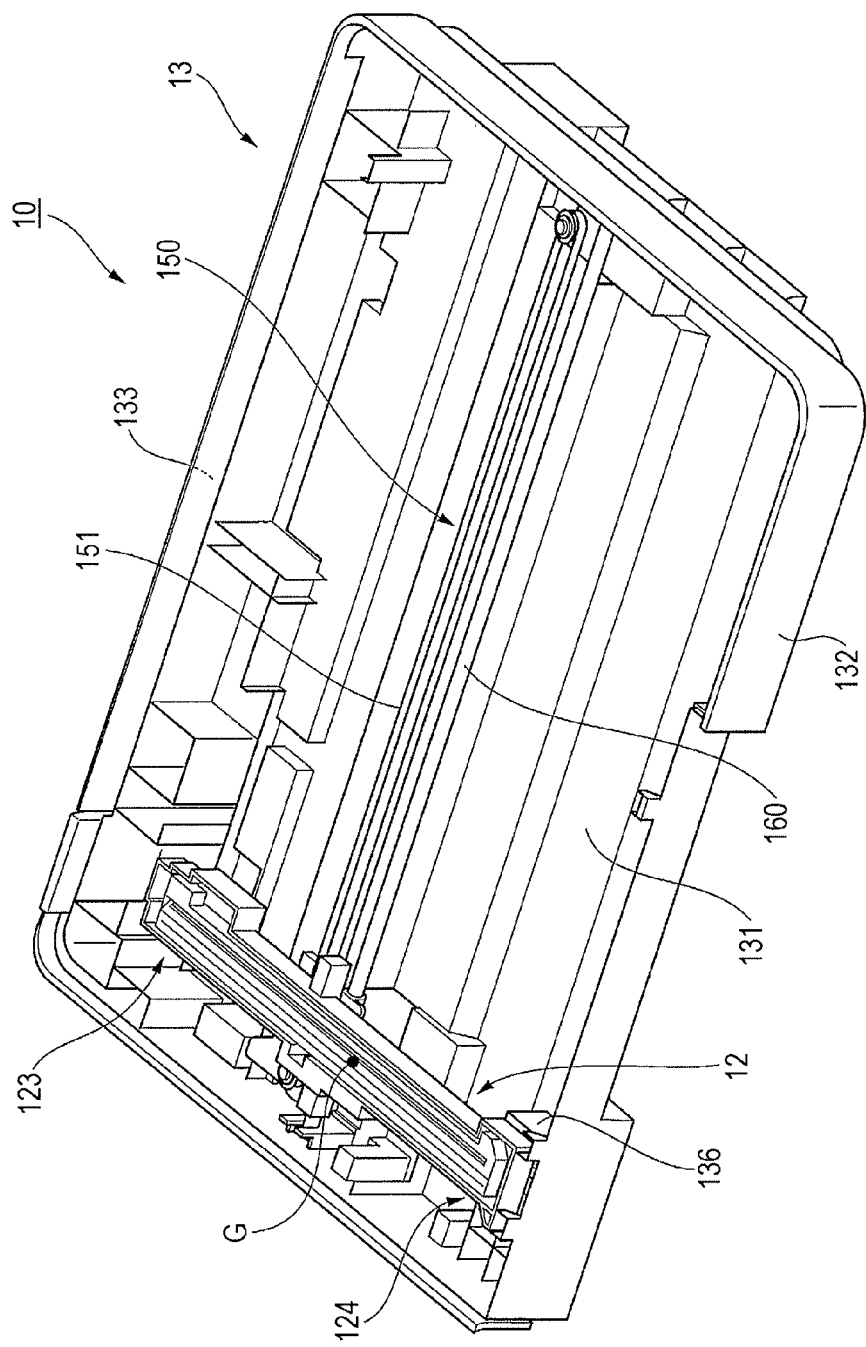
FIG. 4 illustrates a manufacturing process (assembly process) of a scanner device.

FIG. 4 illustrates a manufacturing process (assembly process) of the scanner device 10.

In the manufacturing process of the scanner device 10, first, the moving mechanism 150 and the support shaft 160 are installed in the housing 13. Then, the reading unit 12 is placed on the support shaft 160.

In the present exemplary embodiment, the positions at which the components are installed are determined in advance. The reading unit 12 is attached to the support shaft 160 at a location where the end rib unit 136 is disposed.

After the reading unit 12 has been attached to the support shaft 160, the upper cover 14 (see FIG. 1) is attached to the housing 13.

In the present exemplary embodiment, the center of gravity of the reading unit 12 is displaced from the position at which the support shaft 160 is installed in the longitudinal direction of the reading unit 12. More specifically, in the present exemplary embodiment, the support shaft 160 is disposed at a position shifted from a position directly blow the center of gravity of the reading unit 12.

In the present exemplary embodiment, the position denoted by G is the position of the center of gravity of the reading unit 12, and the support shaft 160 is located further toward the far side in FIG. 4 than the center of gravity G is. In other words, in the present exemplary embodiment, the support shaft 160 is disposed at a position shifted from the center of gravity G of the reading unit 12 toward the far-side end portion 123 of the reading unit 12.

Therefore, in the manufacturing process, when the reading unit 12 is placed on the support shaft 160, the reading unit 12 tries to rotate around the support shaft 160 such that the near-side end portion 124 of the reading unit 12 moves downward. In such a case, the near-side end portion 124 comes into contact with the bottom portion 131 of the housing 13.

Accordingly, in the present exemplary embodiment, the end rib unit 136 is provided as described above. Thus, in the present exemplary embodiment, a support for supporting the near-side end portion 124 is provided above the bottom portion 131.

Therefore, the near-side end portion 124 of the reading unit 12 is supported by the end rib unit 136 at a position above the bottom portion 131 before the near-side end portion 124 reaches the bottom portion 131. In this way, the near-side end portion 124 is prevented from coming into contact with the bottom portion 131.

If the near-side end portion 124 of the reading unit 12 moves downward, the reading unit 12 is easily removed from the support shaft 160.

In the present exemplary embodiment, although the support shaft 160 is received by the recess 122B (see FIG. 3), basically, the reading unit 12 is simply placed on the support shaft 160. Therefore, if the near-side end portion 124 of the reading unit 12 moves downward, the reading unit 12 is easily removed from the support shaft 160.

In contrast, according to the present exemplary embodiment, the downward movement of the near-side end portion 124 is suppressed, and the reading unit 12 is not easily removed from the support shaft 160.

If the near-side end portion 124 of the reading unit 12 is moved downward, the work efficiency in the manufacturing process (assembly process) is reduced.

In the present exemplary embodiment, the reading unit 12 is connected to other components, such as a cable, after the reading unit 12 has been attached to the support shaft 160. The connecting process cannot be easily performed if the near-side end portion 124 is moved downward.

In contrast, according to the present exemplary embodiment, the downward movement of the near-side end portion 124 is suppressed, so that the connecting process is facilitated.

In the present exemplary embodiment, as described above, the end rib unit 136 is located closer to the front surface 132 than to the rear surface 133. However, this is merely an example, and the end rib unit 136 is located closer to the rear surface 133 when the far-side end portion 123 of the reading unit 12 moves downward.

From the viewpoint of improving the appearance of the image reading apparatus 1, it is desirable to place the end rib unit 136 at a location near the front surface 132, that is, behind the front surface 132. In this case, the end rib unit 136 is inconspicuous to the operator that operates the image reading apparatus 1.

In the above-described example, one of the far-side end portion 123 and the near-side end portion 124 of the reading unit 12 is supported by the end rib unit 136. However, in the case where, for example, the support shaft 160 is located directly below the center of gravity G, the end rib unit 136 may be disposed at each of a location near the front surface 132 and a location near the rear surface 133, and the far-side end portion 123 and the near-side end portion 124 may both be supported by the respective end rib units 136.

Moreover, plural end rib units 136 may be provided at different locations in the longitudinal direction of the housing 13.

In such a case, the reading unit 12 may be installed at any of plural locations in the longitudinal direction of the housing 13. Alternatively, the longitudinal rib 82 (see FIG. 2) included in the end rib unit 136 may be provided so as to extend over the entire region of the housing 13 in the longitudinal direction.

When the end rib unit 136 is provided at each of a location near the front surface 132 and a location near the rear surface 133, when plural end rib units 136 are provided at different positions in the longitudinal direction of the housing 13, or when the longitudinal rib 82 extends over the entire region of the housing 13 in the longitudinal direction, the overall rigidity of the housing 13 is increased.

In the above-described example, the end rib unit 136 includes the transverse ribs 81 (see FIG. 2) and the longitudinal rib 82. However, for example, the longitudinal rib 82 may be omitted, and the end rib unit 136 may be constituted only by the transverse ribs 81.

In this case, to prevent the reading unit 12 from falling into a space between the adjacent transverse ribs 81, a distance L between the adjacent transverse ribs 81 (see FIG. 2) is set so as to be smaller than a width W of the reading unit 12.

In addition, the transverse ribs 81 may be omitted, and the end rib unit 136 may be constituted only by the longitudinal rib 82.

Figure 5:
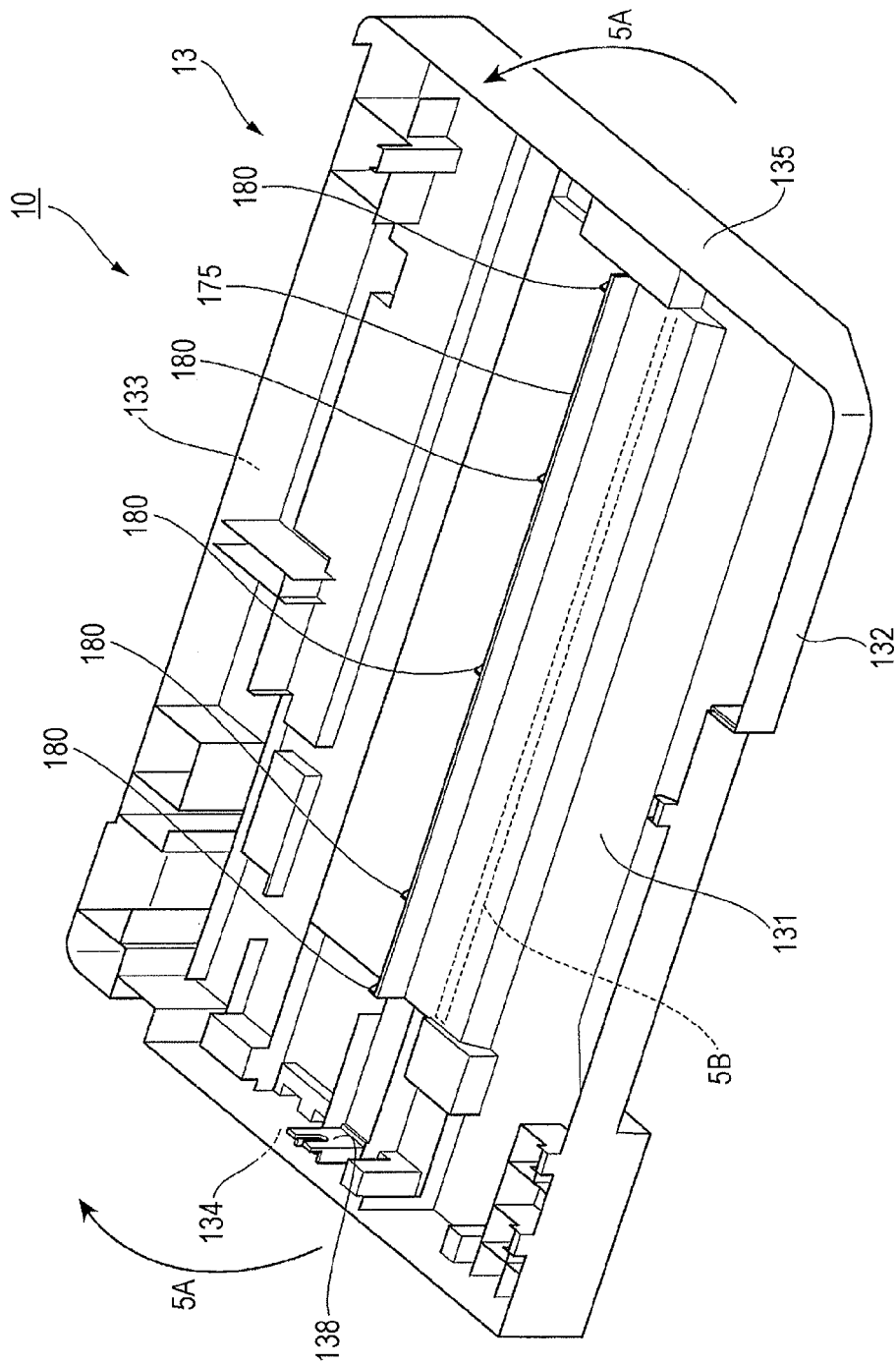
FIG. 5 illustrates the inside of the housing in a state before the reading unit and other components are installed.

FIG. 5 illustrates the inside of the housing 13 in a state before the reading unit 12 and other components are installed.

A shaft holder 138 having a U-shaped groove is provided on the first side surface 134 of the housing 13. An end portion of the support shaft 160 is inserted into this groove, so that the end portion of the support shaft 160 is supported by the housing 13. The second side surface 135 also has a similar shaft holder provided thereon, and the other end portion of the support shaft 160 is supported by this shaft holder.

A reinforcing rib 175 and the shaft ribs 180, which function as shaft supports, are provided on the bottom portion 131 of the housing 13.

The reinforcing rib 175 is arranged so as to extend in the direction in which the support shaft 160 extends (see FIG. 4), and increases the flexural rigidity of the housing 13. More specifically, the flexural rigidity against bending in the direction shown by arrow 5A in FIG. 5 is increased.

Accordingly, in the present exemplary embodiment, deformation of the support shaft 160 is reduced. When deformation of the support shaft 160 is reduced, variation in the position of the reading unit 12 in the vertical direction is reduced, and variation in the distance between the reading unit 12 and the document sheet is reduced accordingly.

Plural shaft ribs 180 are provided at different positions in the axial direction of the support shaft 160. The shaft ribs 180 support a portion of the support shaft 160 located between one end portion and the other end portion of the support shaft 160 from below. Accordingly, bending of the support shaft 160 is suppressed. Therefore, as described above, variation in the position of the reading unit 12 in the vertical direction is reduced, and variation in the distance between the reading unit 12 and the document sheet is reduced accordingly.

In the present exemplary embodiment, not only the shaft ribs 180 but also the reinforcing rib 175 is located below the support shaft 160. Therefore, the appearance of the image reading apparatus 1 is not largely degraded. The reinforcing rib 175 may be disposed at a location other than below the support shaft 160, such as the location denoted by 5B in FIG. 5. However, in such a case, the reinforcing rib 175 becomes conspicuous.

In addition, in the present exemplary embodiment, the shaft ribs 180 are disposed behind the plate-shaped reinforcing rib 175 (at a location closer to the rear surface 133 than the reinforcing rib 175 is). Therefore, compared to the case in which the shaft ribs 180 are disposed in front of the reinforcing rib 175, the shaft ribs 180 are arranged so as to be less conspicuous to the operator of the image reading apparatus 1.

In FIG. 5, each of the shaft ribs 180 is arranged so as to extend in a direction orthogonal to the axial direction of the support shaft 160. However, each of the shaft ribs 180 may instead be arranged so as to extend in the axial direction of the support shaft 160. In such a case, to ensure sufficient contact area between the support shaft 160 and the shaft ribs 180, the shaft ribs 180 may be formed so as to have a thickness greater than that in FIG. 5.

Portions of the shaft ribs 180 that are in contact with the support shaft 160 may be made of an elastic material, such as rubber. In such a case, noise caused by vibration of the support shaft 160 is reduced.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a reading unit extending in a first direction and configured to move in a second direction, which crosses the first direction, to read an image of a document;
a unit support extending in the second direction and that supports the reading unit; and
an end support configured to limit a rotation of the reading unit about a longitudinal axis of the unit support in response to the reading unit rotating about the longitudinal axis of the unit support.

2. The image reading apparatus according to claim 1, wherein the unit support is located at a position shifted from a center of gravity of the reading unit in the longitudinal direction toward a first end portion of the reading unit in the longitudinal direction, and
wherein the end support supports the other end portion of the reading unit in the longitudinal direction, and
wherein the reading unit is biased to rotate around the unit support such that the other end portion moves downward.

3. The image reading apparatus according to claim 1, further comprising:
a housing containing the reading unit, the unit support, and the end support, wherein the housing includes an operator-side surface that is located near an operator when the operator operates the image reading apparatus, and an opposite-side surface opposite the operator-side surface, and wherein the end support is located closer to the operator-side surface than to the opposite-side surface.

4. The image reading apparatus according to claim 1, further comprising:

a housing containing the reading unit, the unit support, and the end support, wherein the housing is configured to include a bottom portion, wherein the end support is configured to be located above the bottom portion, and wherein the end portion of the reading unit is configured to be supported by the end support before the end portion reaches the bottom portion.

5. The image reading apparatus according to claim 1, wherein the unit support is a shaft that extends in the second direction, and wherein the image reading apparatus further comprises:

a shaft support that supports a portion of the shaft from below, the portion being located between a first end portion and the other end portion of the shaft in an axial direction of the shaft.

6. The image reading apparatus according to claim 1, further comprising:

a housing containing the reading unit, the unit support, and the end support, wherein the housing includes a bottom portion, and wherein a rib is formed on the bottom portion of the housing, the rib extending in the second direction.

7. The image reading apparatus according to claim 6, wherein the unit support includes a shaft that extends in the second direction, and wherein the rib is disposed below the shaft.

8. The image reading apparatus according to claim 1, wherein the reading unit directly contacts the unit support.

9. The image reading apparatus according to claim 1, wherein the reading unit is configured to move in a direction perpendicular to the unit support.

10. The image reading apparatus according to claim 1, wherein the reading unit is configured to move and the unit support remains fixed.

11. The image reading apparatus according to claim 1, wherein the end support is configured to prevent the reading unit from rotating around an axis of the unit support.

12. The image reading apparatus according to claim 1, wherein the reading unit is biased to rotate around the unit support.

13. The image reading apparatus according to claim 1, wherein the unit support is a support shaft.

14. The image reading apparatus according to claim 1, wherein the end support supports the reading unit during manufacturing.

15. The image reading apparatus according to claim 1, wherein the end support supports the end portion of the reading unit.

16. The image reading apparatus according to claim 1, wherein the unit support supports the movement of the reading unit in the second direction.

\* \* \* \* \*